Sept. 9, 1958 R. A. CHRISTIAN ET AL 2,851,218
CARRIAGE SHIFTING CONTROL MECHANISM FOR ACCOUNTING MACHINES
Filed Oct. 21, 1955 5 Sheets-Sheet 1

INVENTORS
RAYMOND A. CHRISTIAN
JESSE R. GANGER &
HERBERT C. JOHNSON
BY Earl Beust
Richard Van Buren
THEIR ATTORNEYS Sept. 9, 1958 R. A. CHRISTIAN ET AL 2,851,218
CARRIAGE SHIFTING CONTROL MECHANISM FOR ACCOUNTING MACHINES
Filed Oct. 21, 1955 5 Sheets-Sheet 2

INVENTORS
RAYMOND A. CHRISTIAN
JESSE R. GANGER &
HERBERT C. JOHNSON
BY *Earl Beust*
*Richard Van Buren*
THEIR ATTORNEYS Sept. 9, 1958     R. A. CHRISTIAN ET AL     2,851,218
CARRIAGE SHIFTING CONTROL MECHANISM FOR ACCOUNTING MACHINES
Filed Oct. 21, 1955     5 Sheets-Sheet 3
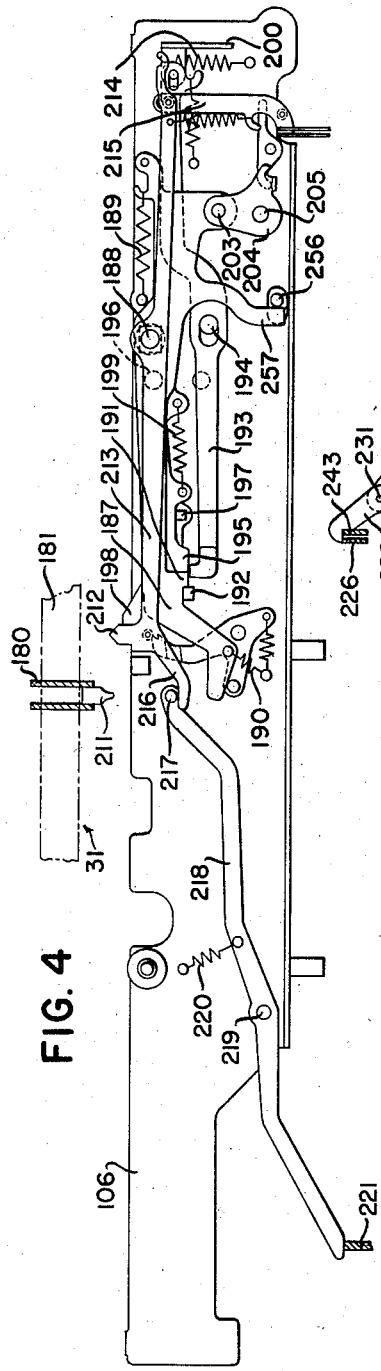
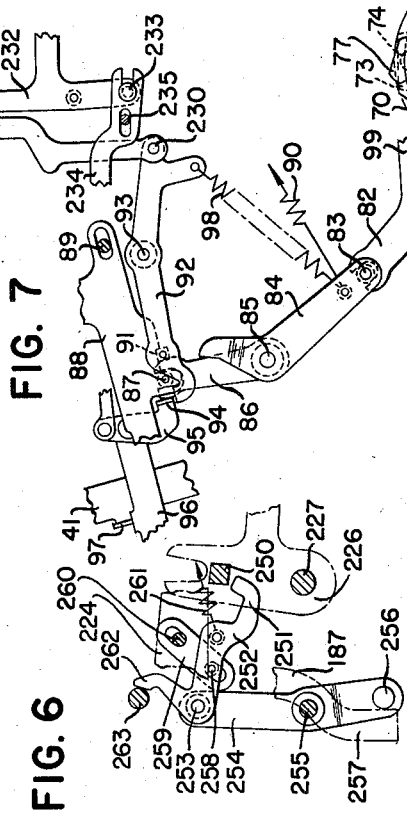
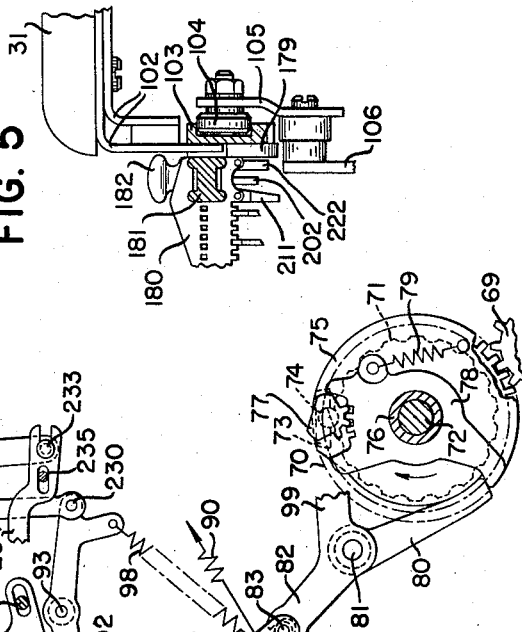
INVENTORS
RAYMOND A. CHRISTIAN
JESSE R. GANGER &
HERBERT C. JOHNSON
BY
THEIR ATTORNEYS Sept. 9, 1958  R. A. CHRISTIAN ET AL  2,851,218
CARRIAGE SHIFTING CONTROL MECHANISM FOR ACCOUNTING MACHINES
Filed Oct. 21, 1955  5 Sheets-Sheet 4

INVENTORS
RAYMOND A. CHRISTIAN
JESSE R. GANGER &
HERBERT C. JOHNSON
BY
THEIR ATTORNEYS

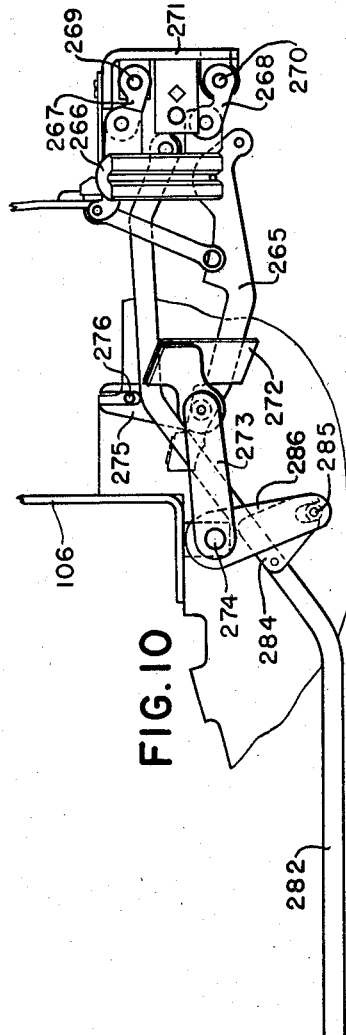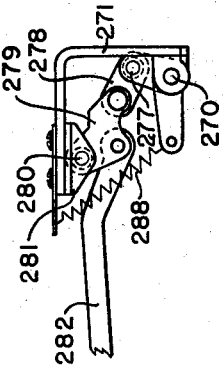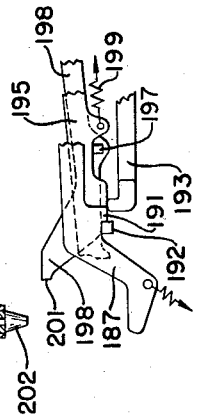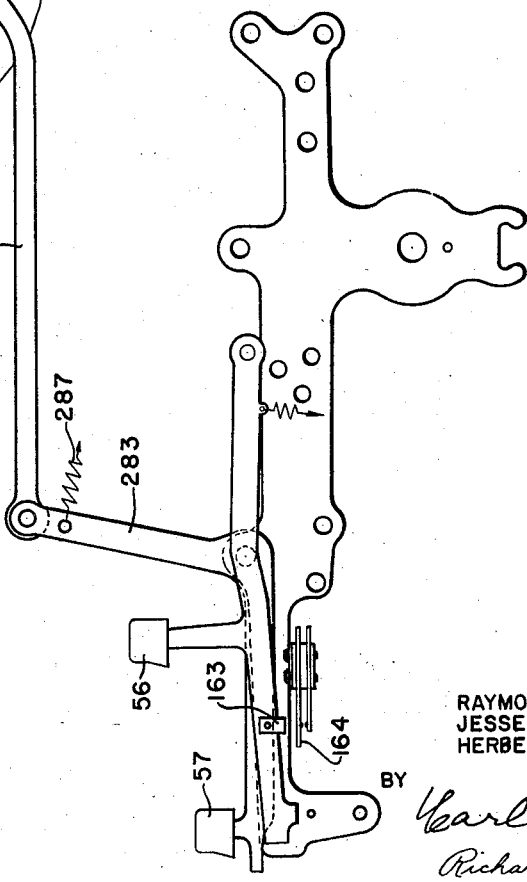

United States Patent Office 2,851,218
Patented Sept. 9, 1958

2,851,218

CARRIAGE SHIFTING CONTROL MECHANISM FOR ACCOUNTING MACHINES

Raymond A. Christian, Jesse R. Ganger, and Herbert C. Johnson, Dayton, Ohio, assignors to The National Cash Register Company, Dayton, Ohio, a corporation of Maryland Application October 21, 1955, Serial No. 542,076

7 Claims. (Cl. 235—60.47)

This invention relates to accounting machines and the like and is particularly directed to the traveling carriages of such machines and means operating under control of said traveling carriage in predetermined columnar positions thereof to initiate and control certain functions of the accounting machine.

Broadly, it is an object of this invention to provide improved means to control the movement of the traveling carriage of accounting machines in either forward or reverse tabulating directions.

Another object is the provision of improved means controlled by the travelling carriage in predetermined columnar positions thereof to initiate operation of the accounting machine when said traveling carriage arrives in a predetermined columnar position while traveling in either forward or reverse tabulating direction.

A further object is the provision of means normally effective to initiate operation of the accounting machine when the traveling carriage arrives in a predetermined columnar position while traveling in a certain tabulating direction and to reverse the action of the initiating means when the traveling carriage arrives in said predetermined columnar position while tabulating in the opposite direction.

With these and incidental objects in view, the invention includes certain novel features of construction and combinations of parts, a preferred form or embodiment of which is hereinafter described with reference to the drawings which accompany and form a part of this specification.

In the drawings:

Fig. 4 is a front elevation of a portion of the mechanism for controlling the tabulating movement of the traveling carriage in either direction.

Fig. 5 is a fragmentary sectional view, as observed from the right, showing a portion of the traveling carriage of the machine.

Fig. 6 is a detail view of a portion of the mechanism for initiating automatic operation of the machine when the traveling carriage is moving in a reverse or right-hand tabulating direction.

Fig. 7 is a right elevation of a portion of the mechanism actuated by the traveling carriage in predetermined columnar positions for initiating operation of the machine.

Fig. 10 is a right side elevation showing in detail the back-space key for reversing the tabulating movement of the traveling carriage, and the shift key and associated mechanism for shifting the entire type basket from lower-case to upper-case printing position.

Fig. 11 is a detail view of a part of the mechanism actuated by the case shift key for shifting the type basket.

Fig. 12 is a detail view of a part of the reverse tabulating control mechanism.

General description

Figure 1:
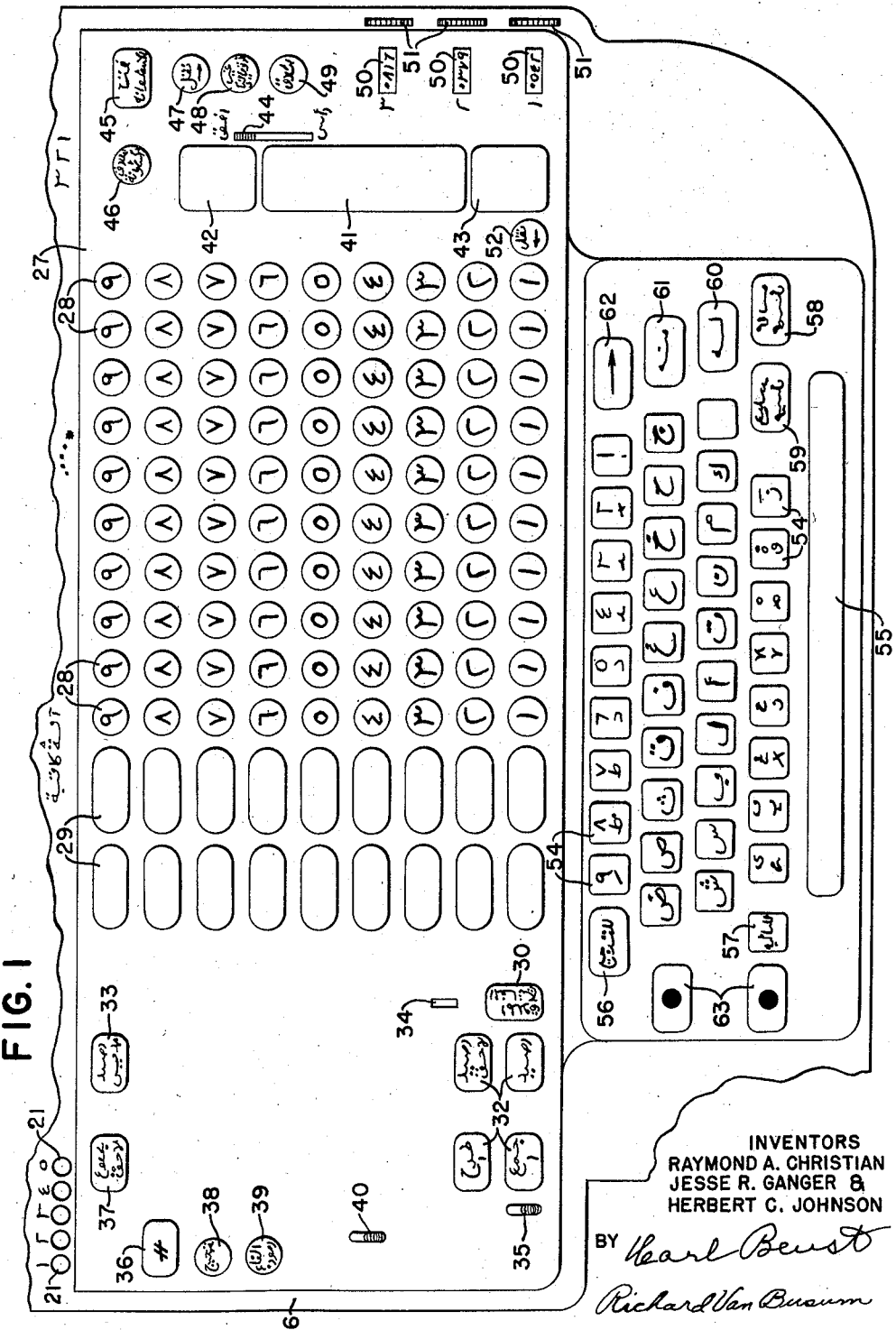
Fig. 1 is a diagrammatic plan view of the keyboard of the machine chosen to illustrate the present invention.

The present invention is directed to the traveling carriage equipment and control mechanism associated therewith of machines of the type disclosed in Letters Patent of the United States Nos. 2,626,749 and 2,626,750, both of which issued on January 27, 1953, to Raymond A. Christian et al., and in application for Letters Patent of the United States Serial No. 424,651, filed April 21, 1954, by Raymond A. Christian et al., inventors.

Reference may be had to the above patents and application for a full disclosure of mechanism not pertinent to the present invention and which for that reason will be described only in a general way in the ensuing pages.

The mechanism of the machine chosen to illustrate the present invention is supported by and between right-hand and left-hand main frames (not shown) in turn secured to a machine base 25 (Figs. 8 and 9), said main frames being maintained in proper spaced relationship to each other by various cross frames, rods, and bars, which in turn assist said frames in supporting the mechanism of the machine. The mechanism of the machine is enclosed in a suitable case or cabinet 26 (Fig. 1), which is in turn secured to the machine framework.

As the machine of this invention is a combination accounting machine and typewriter, the keyboard of the machine naturally includes proper control keys for controlling the functions of both the accounting machine and typewriter sections of the machine. The accounting machine keyboard 27 includes ten rows of amount keys 28 (Fig. 1) and two rows of printing keys 29, which latter keys control the position of corresponding printing sectors to print information of a descriptive or other nature upon the record material. A manually-operable release key 30 is provided for releasing any depressed amount keys 28 or printing keys 29 prior to operation of the machine. The automatic key-releasing mechanism functions prior to termination of machine operation to release the depressed amount keys 28 or printing keys 29, in the usual manner.

The machine chosen to illustrate the present invention has been arranged for use in connection with the Arabic language, and, as a consequence, all of the keys, including the amount and control keys of the accounting machine keyboard and the letter, number, and control keys of the typewriter keyboard, are identified by Arabic characters and terminology. However, in the following description, the English terminology for the different keys and their functions will be used exclusively. This is believed to be more logical, as it is in agreement with the terminology used in the Christian et al. patents and application referred to above, and should provide a clearer understanding of the improved and new features of the machine.

The present machine is provided with six totalizers, not shown, but fully disclosed in the patents and application referred to hereinbefore, of the add-subtract type and arranged to receive positive or negative amounts set up on the amount keys 28. One of the six totalizers is an "X" or overdraft totalizer, which is used in conjunction with the other totalizers to transpose the complementary amounts of overdrafts contained in said other totalizers to true negative amounts for use in providing proper printed records of said amounts. As previously stated, the overdraft totalizer is designated by the letter "X," and the other totalizers are numbered, respectively, 1 to 5. Each of said five totalizers is provided with an overdraft indicator 21 (Fig. 1), which is visible through a corresponding opening in a front panel of the machine case and which becomes effective to display a distinctive signal when the corresponding totalizer is overdrawn, to apprise the operator of this condition.

The present machine is provided with a laterally shiftable traveling carriage 31 (Figs. 2 and 5), which is mounted for right and left horizontal shifting movement upon ways in turn secured to the machine framework. The traveling carriage 31 is provided with a rotatable platen roll (not shown) for supporting record material in proper relationship to the printing mechanism, so that records may be printed on the record material. In the present machine, the various functions of all the totalizers may be controlled by the traveling carriage in preselected columnar positions thereof, said functions including adding, subtracting, sub-total-taking, total-taking, and automatic overdraft operations.

In addition to the controlling of the functions of the totalizers by the traveling carriage, the No. 1 totalizer, which is often referred to as a "balance" totalizer or a "crossfooter," is provided with control keys 32 for controlling the add, subtract, sub-balance, and balance functions therein. Likewise, a manually operable Credit Balance key 33 is provided for manually controlling the overdraft function in the #1 totalizer, and said Credit Balance key may be used in conjunction with either the Sub-Balance key or the Balance key 32 for effecting overdraft operations in connection with the #1 or balance totalizer. The occurrence of an overdraft in the #1 totalizer locks the Sub-Balance and Balance keys 32 against the depression to further warn the operator that said totalizer is overdrawn. However, these keys may be unlocked for depression by means of a push lever 34 (Fig. 1), operation of which permits the depression of the Sub-Balance key or the Balanceo key in conjunction with the Credit Balance key 33. Likewise, in certain systems of operation, it is desired that the Add key 32 for the #1 totalizer remain depressed, so as to select said totalizer for adding operation each machine operation, and, to effect this, a shiftable lever 35 (Fig. 1), located adjacent said key, may be pushed inwardly to lock said Add key in depressed condition until said lever 35 is restored to its forward or normal position.

Under certain conditions, it is desirable that the selection of the totalizers by means of the traveling carriage be rendered inoperative, and, to effect this, a Non-Select key 36 may be depressed to disable all control of the totalizers by the traveling carriage in preselected columnar positions. Other control keys on the left-hand side of the keyboard 27 (Fig. 1) include a Sub-Total key 37, depression of which conditions the totalizers for sub-total-taking operations; a Reverse key 38, depression of which reverses the add or subtract function in the totalizers for use in making corrections; and a Non-Symbol key 39, which prevents the printing of symbols when the traveling carriage is used to select and control the functions of the totalizers. The Non-Select key 36 and the Non-Symbol key 39 are flexible in relation to each other; that is, depression of one releases the other if formerly depressed, and vice versa. A shiftable lever 40 is provided for locking either the Non-Select key 36 or the Non-Symbol key 39 against automatic release at the end of machine operation and against manual release by use of the key 30.

The machine of this invention is provided with three starting bars, a Main bar 41, a Vertical bar 42, and a Skip bar 43, located on the right-hand side of the accounting machine keyboard 27 (Fig. 1), which may be used for manual release of the machine for operation. In addition, the traveling carriage 31 may be arranged to initiate automatic machine operations when it moves into preselected columnar positions, as will be explained later. The Main motor bar 41 is usually used to initiate machine operations. The Vertical motor bar 42, in addition to releasing the machine for operation, also causes the platen roll supported by the traveling carriage 31 to be rotated one, two, or three spaces to line-space the record material supported thereby. The Skip motor bar 43, in addition to releasing the machine for operation, also controls the skip tabulating function of the traveling carriage to cause said carriage to forward tabulate from one columnar position through intervening columnar positions to a preselected columnar position. The motor bars 41, 42, and 43, in addition to the uses outlined above, may be arranged to automatically control other functions of the machine, including forward and reverse tabulating movement of the traveling carriage 31, rotation of the platen roll for the line-spacing of record material, and the opening and closing of the front-feed throat of the traveling carriage. A manually positionable lever 44 is provided immediately to the right of the motor bars 41, 42, and 43 for modifying the functions of these motor bars, as fully disclosed in the Christian et al. Patent No. 2,626,749.

The control keys on the right side of the keyboard 27 (Fig. 1) include a Throat key 45, which may be used to open or close the front-feed throat of the traveling carriage whenever desired, and a carriage Release key 46, which releases the escapement mechanism for the traveling carriage to permit said carriage to be moved in either forward or return directions. The accounting machine control keys also include a Tab key 52, which functions, upon being operated, to cause the traveling carriage 31 to tabulate in a forward direction; a Reverse Tab key 47, which functions, upon being operated, to cause the traveling carriage to tabulate in a reverse direction; and a Non-Automatic key 48, which, when depressed, disables the automatic machine-starting mechanism actuated by the traveling carriage in preselected columnar positions. The Non-Automatic key 48 is a stay-down key, and a Release key 49 is provided for manual release of said Non-Automatic key whenever desired. The accounting machine is provided with three item counters 50, the wheels of which are visible through apertures in the keyboard 27, for keeping an automatic count of certain items as they are entered in the totalizers of the machine. Each item counter 50 is provided with a resetting knob 51 for resetting them to zero whenever desirable.

The machine embodying the present invention is equipped with a complete typewriter mechanism for typing data of a descriptive or other nature upon the record material supported by the platen roll. The keyboard of the typewriter is located immediately in front of the accounting machine keyboard 27 (Fig. 1) and includes a full complement of number and letter keys 54, which actuate corresponding type bars for printing data upon the record material. The typewriter is also provided with the usual Space bar 55 for use in letter-spacing the traveling carriage when the keys 54 are not used, as between words, numbers, etc. The typewriter keyboard likewise includes a Back-Space key 56, which causes the direction of movement of the traveling carriage to be reversed and, when used in conjunction with the keys 54 or the Space bar 55, causes the traveling carriage to be letter-spaced in a reverse direction for as long as said Back-Space key is retained depressed.

All of the type bars of the present machine are contained in a shiftable type basket, which may be shifted, by use of a Shift key 57, from lower-case to upper-case printing position. The typewriter keyboard also includes on its right-hand side a Paper Feed key 58 for controlling the line-spacing of the record material; a Tab key 59 for controlling the forward tabulating movement of the traveling carriage; and three Reverse Tab keys, 60, 61, and 62.

for controlling the reverse tabulating movement of the traveling carriage.

Machine operating mechanism

Figure 8:
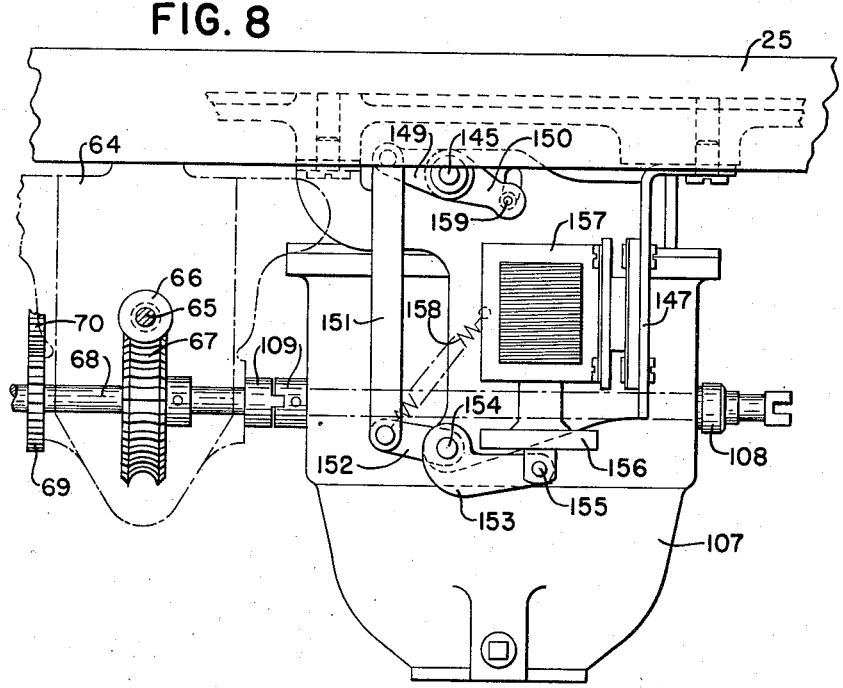
Fig. 8 is a detail view, as observed from the rear of the machine, showing the fluid drive unit for moving the traveling carriage in tabulating directions, and showing the solenoid for reversing the action of said fluid drive mechanism.

Located on the left-hand side of the typewriter keyboard are On and Off keys 63, which operate a switch mechanism for controlling the flow of current to a machine operating motor 64 (Fig. 8). A red signal light (not shown) functions in connection with the On and Off keys 63 and remains lit all the time the On key is effective, calling attention to the fact that the machine operating motor is running. The operating motor 64 comprises an armature shaft 65, which rotates continuously when the motor switch On key 63 is effective. The armature shaft 65 has secured thereon a worm 66, which meshes with and drives a companion worm wheel 67 in turn secured to a shaft 68 journaled in the housing for the motor 64. Secured on the shaft 68 and rotating in unison therewith is a pinion 69, which meshes with and drives a gear 70 (Figs. 7 and 8) secured to and operating in unison with a clutch driving disc 71 free on a main cam shaft 72 journaled in the machine framework. The clutch driving disc 71 has in its periphery a plurality of equally-spaced driving notches, arranged to coact with the tooth of a driving dog 73 secured on a short shaft 74 journaled in a bushing in a clutch-driven disc 75 having a hub 76, which is secured to the main cam shaft 72. Secured on the shaft 74 is a dog-operating segment 77, having gear teeth which mesh with corresponding teeth formed in a segmental portion of a clutch control arm 78, rotatably supported on the hub 76. A spring 79 urges the arm 78 clockwise to normally maintain a downward extension thereof in yielding contact with a tripping arm 80 secured on a short shaft 81 journaled in the machine framework. Also secured on the shaft 81 (Fig. 7) is an arm 82, having a slotted upper end, which freely engages a stud 83 in a downward extension of a lever 84, secured on a short shaft 85, journaled in the machine framework. Also secured on the shaft 85 is a crank 86 with a slotted upper end, which freely engages a stud 87 in a release slide 88, shiftably mounted by means of two parallel slots therein in cooperation with corresponding studs 89 secured in the machine framework, only one of said slots and said studs being shown herein. A spring 90 urges the lever 84, the shaft 85, and the crank 86 counter-clockwise, and said lever 84 in turn urges the arm 82, the shaft 81, and the arm 80 clockwise. The lever 84, the shaft 85, and the crank 86, under influence of the spring 90, urge the slide 88 forwardly to normally maintain a shoulder formed on the downward edge thereof in yielding engagement with a square stud 91, secured in the forward end of a lever 92 pivotally mounted on a stud 93 secured in the machine framework. A spring 98, tensioned between the levers 92 and 84, urges said lever 92 clockwise to normally maintain the stud 91 in the path of the shoulder on the slide 88. The stud 91, coacting with the shoulder on the slide 88 (Fig. 7), causes said slide to normally maintain the arm 80 in the path of the lower end of the clutch control arm 78 to maintain the clutch dog 73 normally disengaged from the operating disk 71, as shown here. A forward hook-shaped extension of the lever 92 underlies and coacts with a bent-over ear 94 on an arm 95 pivoted on a depressible release bar 96 having a raised portion on its upper edge which underlies and coacts with an ear 97 bent outwardly from the stem of the Main motor bar 41 (see also Fig. 1).

Depression of the motor bar 41, to initiate machine operation (Figs. 1 and 7), causes the ear 97 to depress the bar 96 and the arm 95, whereupon the ear 94 rocks the lever 92 counter-clockwise, against the action of the spring 98, to disengage the stud 91 from the shoulder on the slide 88 to free said slide and connected parts to the action of the spring 90. The spring 90 immediately rocks the lever 84, the shaft 85, the crank 86, and the slide 88 counter-clockwise or forwardly and the arm 82, the shaft 81, and the arm 80 clockwise to move said arm 80 out of the path of the lower end of the arm 78. This frees the arm 78 to the action of the spring 79, which immediately rocks said arm clockwise, causing said arm in turn to rock the segment 77, the shaft 74, and the dog 73 counter-clockwise to engage said dog with one of the notches in the operating disk 71. Inasmuch as the disk 71 is rotating continuously, the engagement of the dog 73 permits said disk to carry said dog and connected parts, including the arm 78, the clutch-driven disk 75, and the main cam shaft 72, clockwise (Fig. 7) in unison therewith.

Near the end of one clockwise revolution of the main cam shaft 72 and connected parts, a cam (not shown), secured on said shaft, engages a roll (not shown) mounted on a rearward extension 99 (Fig. 7) of the arm 82, to restore said arm, the shaft 81, and the arm 80 counter-clockwise, against the action of the spring 90, to move said arm 80 into the path of the arm 78. The arm 78, upon being blocked from further rotation, disengages the dog 73 from the disk 71 to terminate rotation of the cam shaft 72. The arm 82, upon being restored, simultaneously restores the lever 84, the shaft 85, the crank 86, and the slide 88 clockwise, or rearwardly, until the shoulder on said slide by-passes the stud 91 in the lever 92, whereupon said stud engages said shoulder to retain said slide and connected parts in restored condition. A non-repeat mechanism functions automatically, in case the motor bar is retained depressed at the end of an operating cycle, to rock the arm 95 and the ear 94 clockwise out of the path of the forward end of the lever 92, so as not to interfere with the restoring movement of said lever to engage the stud 91 with the shoulder on the slide 88, and thus prevents unnecessary repeat operating cycles of the machine.

The vertical motor bar 42 (Fig. 1) and the skip motor bar 43 function in exactly the same manner as the main motor bar 41, when depressed, to in turn depress the bar 96 to initiate machine operation.

The main cam shaft 72 (Fig. 7) operates all the mechanism of the accounting machine with the exception of the traveling carriage, which is operated in a manner to be described later, and one clockwise revolution of said main cam shaft is all that is required to operate the machine for all types of operations, including adding, subtracting, and total-taking operations.

The main operating motor 64 is connected to and drives a typewriter operating roll (not shown) for the automatic typewriter portion of the machine, and said roll, in turn, functions, upon depression of any of the keys of the typewriter keyboard, to operate the mechanism, including type bars and tabulating mechanism, associated with said keys in the usual manner, as fully disclosed in the Christian et al. Patent No. 2,626,749.

Traveling carriage

The traveling carriage 31 is mounted for horizontal shifting movement in forward or return directions by means of a horizontal tubular rail (not shown) mounted near its rear end, which engages corresponding rollers mounted on a bar (not shown) and secured to the machine framework. The forward portion of the traveling carriage 31 (Fig. 5) has secured to its framework a bracket 102, in turn having secured thereto an escapement bar 103, which extends substantially the full length of the traveling carriage. The rearward face of the escapement bar 103 has therein a channel which engages a plurality of rollers 104 rotatably supported on studs in turn secured in the upper edge of a plate 105 connected by various studs and screws to an angle bar 106 in turn secured to the machine framework. The bar 103 and the rollers 104 assist the tubular rail and its corresponding rollers in supporting the traveling carriage 31 for horizontal shifting movement.

Figure 9:
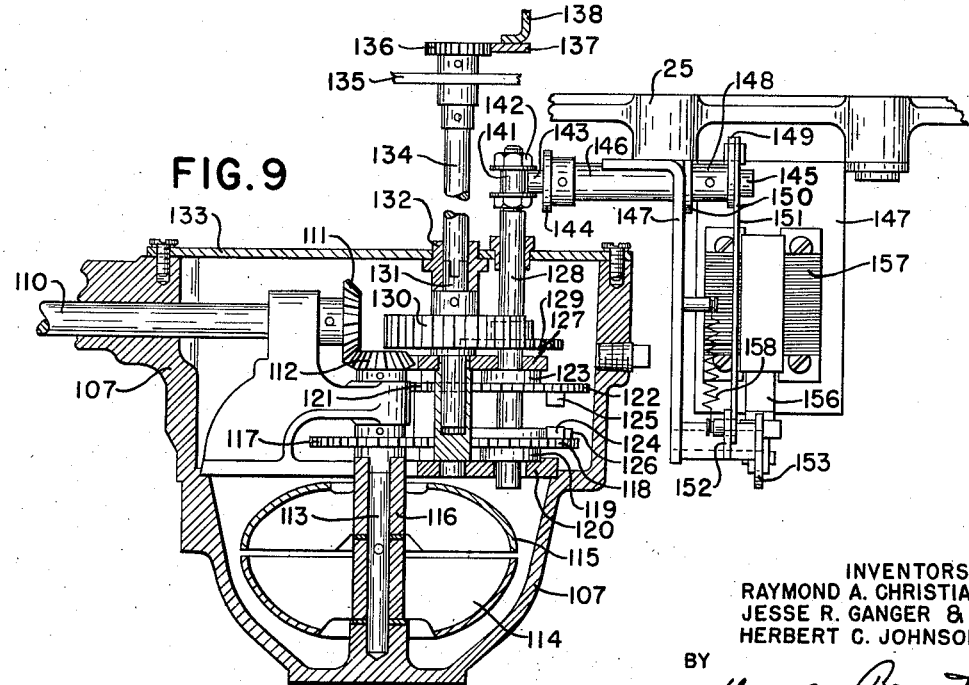
Fig. 9 is a right side elevation of the fluid drive unit with the housing broken away to show more clearly the reversible mechanism for driving the traveling carriage in tabulating directions.

Referring to Figs. 8 and 9, the traveling carriage 31 is driven in forward and return tabulating directions through the medium of a fluid drive or clutch mechanism which is in turn driven by the main operating motor 64. The fluid drive mechanism is contained in a cast housing 107 secured to the machine base 25 and is operated by a shaft 108 journaled in said housing and connected by a spline-and-tenon clutch 109 to the shaft 68, which is in axial alignment with said shaft 108 and is driven continuously by the main operating motor 64. The shaft 108 has secured thereon a worm wheel (not shown) which meshes with a worm (not shown) in turn secured on the outer end of a fluid drive shaft 110 (Fig. 9) journaled in the housing 107. Secured on the inner end of the shaft 110 is a bevel gear 111, which meshes with a companion bevel gear 112 secured on the upper end of a vertical shaft 113 rotatably supported in the housing 107.

Secured near the lower end of the shaft 113 is a clutch-driving member 114, which coacts with and drives a companion clutch-driven member 115, having a hub portion 116, which rotates freely on said shaft 113. The bottom part of the housing 107 forms a sump or reservoir containing enough fluid to properly cover the members 114 and 115 to form a fluid connection between said members, whereby rotation of the driving member 114 through the fluid carries the driven member 115 yieldingly in unison therewith. The hub 116 (Fig. 9) for the clutch-driven member 115 has a spline cut which engages a tenon on a hub free on the shaft 113 and having integral therewith a gear 117. The gear 117 meshes with and drives a gear 118 rotatably supported on the outer diameter of a bushing 119 secured in a cover plate 120 in turn mounted in the housing 107 and forming a cover for the sump or reservoir portion of said housing. The gear 118 meshes with and drives a pinion (not shown) in turn connected by a bushing free on a stud secured in the cover 120 to a companion gear 121, which meshes with and drives a gear 122 in a reverse direction to the gear 118, said gears acting, as will be explained presently, to drive the traveling carriage 31 in return and forward directions.

The gear 122 is in axial alignment with the gear 118 and is free on the outer surface of a bushing 123 secured in a bracket 127 in turn secured to the cover 120. The gears 118 and 122 carry, respectively, coupling studs 124 and 125, arranged to engage a shiftable coupling finger 126 secured near the lower end of a vertical shaft 128 journaled in the bushings 119 and 123 and in a bushing in a top cover plate 133 for the fluid drive unit. In addition to being rotatable, the shaft 128 (Fig. 9) is also shiftable vertically to move the coupling finger 126 into and out of coacting relationship with the studs 124 or 125, as will be explained presently. Secured on the shaft 128 is a gear 129, which meshes with a wide faced gear 130 secured on a vertical shaft 131, the lower end of which is rotatably supported in a boring in a stud secured to the cover 120, and the upper end of which is rotatably supported in a bushing 132 secured in the cover plate 133.

The upper end of the shaft 131 has a clutch cut engaged by a tenon formed on the lower end of a vertical shaft 134, the lower end of which is rotatably supported in the bushing 132 and the upper end of which is journaled in a bushing secured in a bracket 135 in turn secured to the machine framework. Secured on the upper end of the shaft 134 is a gear 136, which meshes with the teeth of a rack 137 secured by an angle bar 138 to the traveling carriage 31, said rack extending substantially the full length of the traveling carriage for the purpose of driving said carriage in return and forward tabulating directions.

The coupling shaft 128 (Figs. 8 and 9) is shiftable vertically through the medium of a grooved collar 141 adjustably connected to the upper end of said shaft by means of clamping nuts 142 threaded on the upper end of said shaft. The groove in the collar 141 is engaged by a shifting stud 143 secured in a crank 144 in turn secured on the left-hand end of a short shaft 145 journaled in a hub 146 secured to a bracket 147 in turn secured to the bottom surface of the machine base 25. Secured on the right-hand end of the shaft 145 is a hub 148, which connects in fixed relationship to each other a crank 149 and a stop arm 150. The crank 149 (Figs. 8 and 9) is pivotally connected by a link 151 to a companion crank 152 in turn fixedly connected by a hub to an arm 153, said hub being pivoted on a stud 154 secured in the bracket 147. The right-hand end of the crank 153 extends into a slot formed by downwardly-extending legs of a vertically-shiftable armature 156 of an electrically-operated solenoid 157 secured to the bracket 147, said crank 153 being pivotally connected to said legs by a stud 155 supported by said legs and freely engaging a hole in the right end of said crank.

The stop arm 150 carries a stud 159 (Fig. 8), which extends into an arcuate slot in the bracket 147 and serves to limit the movement of said arm, the shaft 145, the crank 144, and the stud 143 to determine the extent of vertical shifting movement imparted to the shaft 128 by the solenoid 157, and by a spring 158, tensioned between the crank 152 and the bracket 147. When the solenoid 157 is not energized, the spring 158 urges the armature 156 downwardly and the crank 150 and the shaft 145 clockwise (Fig. 8) to normally maintain the stud 159 in yielding engagement with the bottom of the slot, whereupon the crank 149, the shaft 145, and the crank 144 normally maintain the shaft 128 and the coupling finger 126 in their downward position, where said finger will coact with the studs 124 in the gear 118. Inasmuch as the gear 118 (Fig. 9) tends to drive the traveling carriage in a return, or right-hand, direction, it is therefore obvious that under normal conditions—that is, when the solenoid 157 is not energized—the coupling member 126, in cooperation with the studs 124, will, through the connecting train of gearing, including the gear 136 and the rack 137 (Fig. 9), tend to yieldingly drive the traveling carriage in a return, or right-hand, direction.

The solenoid 157 may be energized in either of two manners; one, by a switch controlled by the forward tabulating mechanism, and, two, by a switch controlled by the Back Space key 56 (Figs. 1 and 10), as will be explained later. The solenoid 157, upon being energized by closing of either of the switches, shifts the armature 156 (Figs. 8 and 9) upwardly to rock the shaft 145 counterclockwise against the action of the spring 158. Counterclockwise movement of the shaft 145 lifts the crank 144, which, through the stud 143, in cooperation with the grooved collar 141, shifts the shaft 128 upwardly to move the coupling finger 126 out of coacting relationship with the studs 124 and into coacting relationship with the studs 125 in the gear 122, which rotates reversely in relation to the gear 118 and therefore tends to drive the traveling carriage in a forward, or left-hand, direction.

The instant the control switches for the solenoid 157 are opened, the spring 158 immediately returns the armature 156 downwardly and the shaft 145 clockwise (Fig. 8) to shift the shaft 128 (Fig. 9) downwardly to again move the coupling finger 126 downwardly to its normal position, where it is in coacting relationship with the studs 124, which tend, through the fluid drive mechanism, to move the traveling carriage in a return, or right-hand, direction.

*Carriage escapement mechanism*

The traveling carriage 31 (Figs. 2 and 3) is restrained against movement under influence of the fluid drive mechanism by means of an escapement mechanism comprising two sets of escapement pawls 161 and 162, which coact with teeth cut in the lower edge of the escapement bar 103. As stated before, the machine chosen to illustrate the present invention is arranged for use in connection with the Arabic language, which is written from right to left, or just reverse of the English language. Inasmuch as the machine was originally arranged for use in connection with the English language, it was necessary to rearrange the traveling carriage mechanism to urge the traveling carriage in what is commonly known in English-speaking countries as a return direction, or toward the right. Therefore, as explained above, the fluid drive mechanism of the instant machine operates normally to urge the traveling carriage in a return, or right-hand, direction, but it is restrained from doing so by the escapement pawls 161 and 162 in cooperation with the teeth in the bar 103. Operation of the typewriter keys 54 or the Space bar 55 actuates the escapement pawls 161 and 162 to permit the traveling carriage 31 to escape one letter-space toward the right each time one of said keys or said Space bar is depressed.

If necessary or desired, reversing the direction of travel of the traveling carriage 31 during typewriting operations may be accomplished by depressing the Back Space key 56 (Figs. 1 and 10), which causes a block 163 thereon to engage and close a fluid drive reversing switch 164, secured to the typewriter framework. Inasmuch as the switch 164 is connected in the circuit of the fluid drive reversing solenoid 157 (Figs. 8 and 9), said solenoid is energized and shifts the coupling finger 126 upwardly out of coacting relationship with the studs 124 and into coacting relationship with the studs 125, to reverse the action of the fluid drive mechanism, which then tends to urge the traveling carriage in a forward, or left-hand, tabulating direction. Use of the typewriter keys 54 and the Space bar 55 while the Back Space key 56 is retained depressed will cause the traveling carriage to letter-space toward the left, or in a forward tabulating direction. Release of pressure on the Back Space key permits said key to be spring-returned upwardly to open the switch 164 and thus break the circuit to the reversing solenoid 57 to permit the spring 158 to restore the coupling finger 126 downwardly to normal position, where it will coact with the studs 124.

The escapement pawls 161 and 162 (Fig. 2) may be moved to ineffective position by depression of the Carriage Release key 46 (Fig. 1), thus permitting the traveling carriage to be manually moved in either direction when the operating motor is not running, and also freeing said traveling carriage for movement in a right-hand, or return, direction when the operating motor is running.

*Forward tabulating control mechanism*

A second switch 165 (Fig. 2), mounted on the bar 106, is provided for controlling the operation of the reversing solenoid 157 by the forward tabulating mechanism. The switch 165 is normally held open by a stud 166, carried by a finger 167, secured to the left end of a forward tablulating lever 168, slotted to rotatably and shiftably engage a stud 169, secured in the bar 106. Springs 170 and 171 urge the lever 168 toward the right and clockwise, respectively, to normally retain the left edge and bottom of a step 172 on said lever in yielding contact with a square stud 173, secured to the bar 106. Adjacent the step 172 is a downward projection arranged to be engaged by the upper end of an arm 174 carried by a lifting lever 175 free on a stud 176 secured in the bar 106. The lever 175 is arranged to be actuated in a clockwise direction (Fig. 2) under control of the motor bars 41, 42, and 43 and under control of the Tabulating key 52, varying extents to in turn rock the lever 168 counter-clockwise to disengage the step 172 from the stud 173. This permits the spring 170 to shift the lever 168 toward the right, which, combined with the rotary movement of said lever, rocks the stud 166 downwardly to permit the switch 165 to close. This energizes the reversing solenoid 157, in the manner expained before, whereupon said solenoid causes the action of the fluid drive mechanism to be reversed to urge the traveling carriage in a forward, or left-hand, direction.

The lifting movement of the lever 175 and the arm 174 simultaneously lifts an abutment arm 177, pivoted on a stud 178 in the lever 168, also upwardly in unison therewith into the path of one or more forward tabulating stops 179 (Figs. 2 and 5), carried by a series of carriage stop blocks 180 selectively positioned along a stop bar 181 by engagement with proper ones of a series of equally-spaced grooves in the top and bottom edges of said bar. The stop bar 181 extends substantially the full length of the traveling carriage and is removably connected to the escapement bar 103 by means of holes therein in cooperation with turn bolts 182 carried by slotted brackets in turn secured to the escapement bar 103, thus providing means for readily removing the stop bar 181 and its assembly of stop blocks 180 and replacing it with a different stop bar containing stop blocks arranged for a different business system or a different branch of work in connection with a certain business system.

Figure 2:
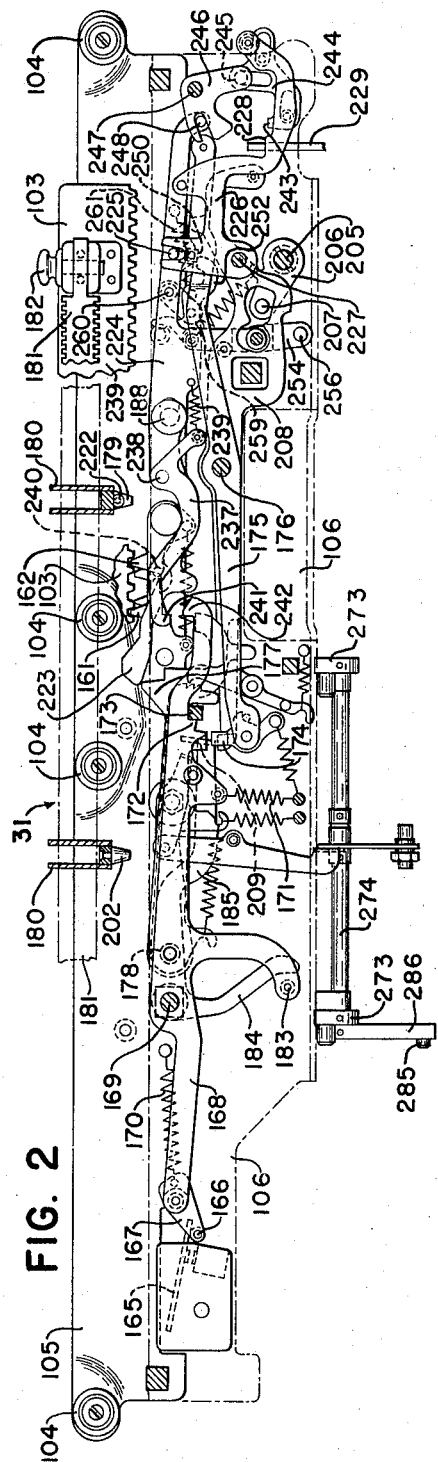
Fig. 2 is a front elevation of a part of the mechanism controlling the tabulating movement of the traveling carriage in either direction and for initiating automatic operation of the machine under control of said traveling carriage.
Figure 3:
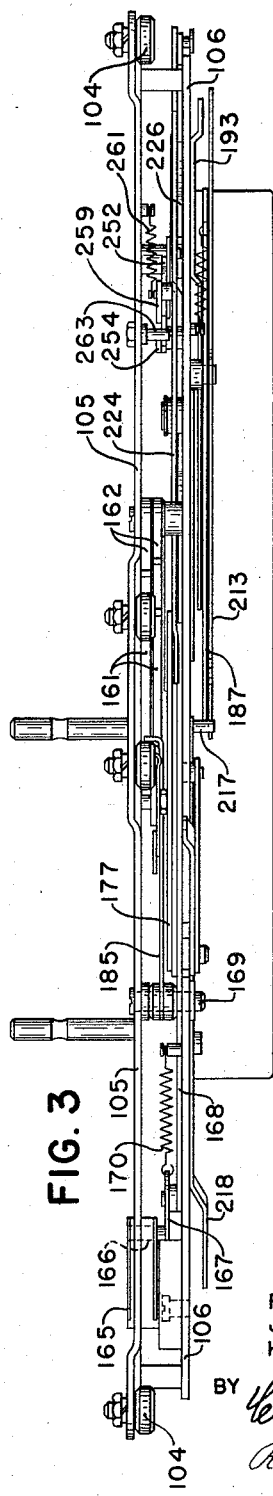
Fig. 3 is a top plan view of the mechanism shown in Fig. 2.

Lifting or counter-clockwise and right-hand shifting movements of the lever 168 (Fig. 2), as explained above, cause a stud 183 in a downward extension thereof to engage a downward extension 184 of an escapement disabling lever 185, free on the stud 169, and rock said lever counter-clockwise, to rock the escapement pawls 161 and 162 out of engagement with the rack teeth in the escapement bar 103 to free the traveling carriage for forward tabulating movement. When the traveling carriage arrives in the selected columnar position, the corresponding stop 179 comes into contact with the abutment lever 177 and shifts said lever and the tabulating lever 168 toward the left, against the action of the spring 170, until the step 172 moves beyond the stud 173, whereupon the spring 171 restores said lever 168 downwardly, or clockwise, to normal position, as shown in Fig. 2. The restoring of the lever 168 permits the escapement lever 185 to be spring-restored clockwise, or downwardly, to render the escapement pawls 161 and 162 effective to engage the escapement teeth in the bar 103 to retain the traveling carriage 31 in the selected columnar position. The restoring movement of the lever 168 also causes the stud 166 to open the switch 165 to break the circuit to the reversing solenoid 157 (Figs. 8 and 9), whereupon the spring 158 restores the coupling finger 126 to its downward, or normal, position, as shown here.

*Reverse tabulating control mechanism*

Mechanism somewhat similar to and functioning like the forward tabulating mechanism, described above, is provided for effecting and controlling tabulating movement of the traveling carriage in a return, or right-hand, direction, to various preselected columnar positions.

The return tabulating control mechanism comprises a tabulating control lever 187 (Figs. 4 and 12), slotted to rotatably and shiftably engage a stud 188, secured in the bar 106. Springs 189 and 190 urge the lever 187 toward the left and counter-clockwise, respectively, to normally maintain a right-hand surface, formed by a step 191 on said lever 187, in yielding engagement with a square stud 192, secured in the bar 106. The left-hand end of a lifting lever 193, pivoted on a stud 194 secured in the bar 106, underlies and coacts with the step 191. The left-hand end of the lever 193 also underlies and coacts with a downward surface formed on the left end of a lever 195, pivoted on a stud 196, secured in the lever 187. A downward surface of the lever 195 overlies and coacts with a square stud 197 in a return tabulating abutment lever 198, also pivoted on the stud 196. A spring 199, tensioned between the levers 195 and 187, urges said levers in opposite directions to normally maintain the stud 197 in yielding contact with the downward surface on the lever 195. The right-hand end of the lifting lever 193 (Fig. 4) is pivotally connected to an operating bar 200, which is actuated by the return tabulating mechanism under control of the motor bars 41, 42, and 43 (Fig. 1), the Reverse Tabulating key 47, and the typewriter Reverse Tab keys 60, 61, and 62, to rock said lever 193 downwardly, or clockwise. Clockwise movement of the lever 193 lifts the lever 187 also clockwise to disengage the step 191 from the stud 192 to free said lever 187 to the action of the springs 189 and 190, which immediately shifts said lever toward the left. Clockwise lifting movement of the lever 193 also lifts the lever 195, which, through the stud 197, lifts the abutment lever 198 also clockwise to move an abutment surface 201 (Fig. 12) on said lever 198 into the path of one of a series of reverse tabulating stops 202 (Figs. 2 and 5) carried by predetermined ones of the stop blocks 180.

A downward extension formed on the right-hand end of the lever 187 (Figs. 2 and 4) is pivotally connected by a stud 203 to the upper end of a crank 204, secured on a shaft 205, journaled in the machine framework. Also secured on the shaft 205 is a crank 206 carrying a stud 207, which extends through an opening formed in a lever 208 free on the stud 176. The left-hand end of the lever 208 underlies a bent-over ear 209 on the escapement release lever 185. Left-hand shifting movement of the lever 187, when it is lifted by the lever 193 (Fig. 4), as explained above, rocks, the crank 204, the shaft 205, and the crank 206 counter-clockwise, causing the stud 207 to engage the lower surface of the opening in the lever 208 and rock said lever clockwise. The lever 208 in turn rocks the escapement lever 185 counter-clockwise to release the escapement pawls 161 and 162 (Figs. 2 and 3) in the same manner as explained in connection with the forward tabulating mechanism. Disengagement of the escapement pawls frees the traveling carriage 31 for tabulating movement in a return, or right-hand, direction, until the proper one of the stops 202 contacts the abutment surface 201 (Figs. 4 and 12). Final return movement of the traveling carriage restores the levers 195, 198, and 187 to the right and downwardly, or counter-lockwise, to again engage the step 191 with the stud 192 to retain said parts in restored condition. The restoration of the lever 187 permits the escapement pawls 161 and 162 (Figs. 2 and 3) to again engage the rack teeth on the bar 103 to terminate return tabulating movement of the traveling carriage and to retain said carriage in selected columnar position.

There are several different lengths of return tabulating stops 202 (Figs. 2, 4, 5, and 12), and the lever 198 may be selectively lifted varying extents to move the abutment surface 201 into the path of all or certain ones of said stops 202 the amount of lifting movement imparted to the lever 198 is controlled by the lifting lever 193, which in turn may be rocked varying extents by the reverse tabulating mechanism operating under control of the motor bars 41, 42, and 43 (Fig. 1), the Reverse Tab key 47, and the typewriter Reverse Tab keys 60, 61, and 62, to selectively control the columnar positioning of the traveling carriage 31 while it is moving in a return, or right-hand, direction.

The tabulating movement of the traveling carriage in forward and return directions may likewise be controlled by the traveling carriage itself in preselected columnar positions, in the manner fully explained in the Christian et al. Patent No. 2,626,749.

When the traveling carriage 31 is "off stop," or not properly located in columnar position, the machine releasing mechanism is disabled for operation and remains so until the said traveling carriage is properly located in columnar position. This feature is controlled by means of tappets 211 (Figs. 4 and 5), one of which is mounted in each of the control blocks 180. When the traveling carriage is properly located in columnar position; one of the tappets 211 engages an angular upward extension 212 on a lever 213, pivoted on the stud 188, and rocks said lever counter-clockwise against the action of a spring 214. Counter-clockwise movement of the lever 213 lifts a link 215 to enable the machine releasing mechanism in the manner explained in the Christian et al. Patent No. 2,626,749, so that operation of the machine may be initiated. When the lever 213 is in its undepressed, or clockwise, position, as shown in Fig. 4, the machine releasing mechanism is disabled against operation by the motor bars 41, 42, and 43 (Fig. 1) or by the traveling carriage in preselected columnar positions, as will be explained presently.

The lever 213 (Fig. 4) is also arranged to be rocked counter-clockwise by depression of the Non-Select key 36 (Fig. 1) as follows. A finger 216, extending from the left-hand end of the lever 213, underlies a stud 217 in the right-hand end of a lever 218, pivoted on a stud 219, secured in the bar 106. An arm 221, which is actuated by depression of the Non-Select key 36, underlies the left-hand end of the lever 221, and depression of said Non-Select key causes said arm 221 to rock the lever 218 clockwise against the urgency of a spring 220 (Fig. 4), whereupon the stud 217, coacting with the finger 216, rocks the lever 213 counter-clockwise to disable the machine releasing mechanism.

*Automatic machine releasing mechanism*

The present machine is provided with a mechanism for automatically releasing the machine for operation when the traveling carriage arrives in certan preselected columnar positions while traveling in either a forward or a reverse tabulating direction. Previous machines of this type were arranged to initiate automatic machine operation only while the traveling carriage was tabulating in a forward direction, and the provision of improved mechanism to effect the automatic initiation of machine operation while the traveling carriage is traveling in either direction greatly increases the efficiency, flexibility, and and versatility of the machine and is a feature of decided value in connection with the many and varied business systems to which the machine is applicable.

In columnar positions of the carriage where it is desired to have the machine cycle automatically, the stop block 180 (Figs. 2 and 5) for that particular column carries a machine releasing stud 222, which coacts with an upwardly-projecting surface 223 on a machine release lever 224, pivoted on the stud 188. The lever 224 carries a stud 225, which engages a slot in an upward extension of a lever 226 pivoted on a stud 227 secured in the machine framework. A right-hand extension of the lever 226 has a flat surface 228, which underlies and coacts with a shoulder formed on the upper end of a machine release bar 229 (see also Fig. 7) pivoted at its lower end on a stud 230 carried by the machine release lever 92. The bar 229 has, near its upper end, a slot which is engaged by a stud 231 in an upward extension of a link 232, carrying, in a downward extension thereof, a stud 233, which engages a slot in the inner end of a bar 234, mounted for substantially horizontal shifting movement by means of parallel slots therein, in cooperation with fixed studs 235, only one of said slots and said studs being shown herein. The right-hand end of the link 232 is connected to a slide (not shown), which in turn is controlled by the overdraft mechanism for the different totalizers, so that the bar 229 is rocked clockwise, when an overdraft occurs in one of the totalizers, out of the path of the surface 228 on the lever 226 (Fig. 2), so that under normal conditions the automatic machine releasing mechanism will not function when a totalizer is in an overdrawn condition.

The lever 224 (Fig. 2) carries a stud 238, which pivotally supports an operating lever 237, urged counter-clockwise by a spring 239, to normally maintain a stud 240, carried thereby, in yielding contact with the upper edge of said lever 224. A shoulder, formed by a hook-shaped left-hand extension 241 of the lever 237, is arranged to coact with a similar shoulder formed on a hook-shaped right-hand extension 242 of the lever 168, during forward tabulating movement of the traveling carriage. Lifting of the lever 168 (Fig. 2) by the lever 175, as explained previously, and simultaneous right-hand shifting movement of said lever 168, as the step 172 moves over the stud 173, permits the shoulder formed on the hook 242 to move to the right of the shoulder formed on the hook 241. Forward tabulating movement of the traveling carriage into a columnar position having a stop block 180 with one of the machine release studs 222 causes said stud, in cooperation with the extension 223, to depress the levers 224 and 237 counter-clockwise to move the shoulder on the hook 241 into the path of the shoulder on the hook 242. Restoring movement toward the left of the lever 168, effected by engagement of one of the forward tabulating stops 202 with the abutment surface on the lever 177, causes the hook 242, in cooperation with the hook 241, to shift the levers 224 and 237 toward the left, as viewed in Fig. 2, upon the stud 188. Left-hand shifting movement of the lever 224, through the stud 225, rocks the lever 226 counter-clockwise, causing the surface 228, in cooperation with the shoulder formed on the upper end of the bar 229 (see also Fig. 7), to shift said bar upwardly to rock the lever 92 counter-clockwise, against the action of the spring 98, to free the slide 88 in the manner explained before, to initiate operation of the machine in the same manner as explained earlier in connection with the motor bars 41, 42, and 43 (Fig. 1).

As previously explained, when an overdraft occurs in one of the totalizers, the link 232 (Figs. 2 and 7) rocks the upper end of the bar 229 out of the path of the surface 228 on the lever 226, to normally prevent automatic release of the machine when a totalizer is in an overdrawn condition. However, under such conditions, the shoulder formed on the upper end of the bar 229 remains in the path of an upward projection 243 of an operating slide 244, shiftably mounted on the right-hand end of the lever 226 by means of parallel slots in said slide, in cooperation with corresponding studs in said lever 226. A vertical slot in the upper end of the slide 244 is engaged by a stud 245 in one arm of a bell crank 246 pivoted on a stud 247 secured in the machine framework. A slot in the other arm of the bell crank 246 engages a stud 248 in the right-hand end of the lever 224.

As explained in the Christian et al. Patent No. 2,626,-750, the studs 222 may be provided in small and large diameters, either of said diameters being effective to operate the bar 229 when it is in the path of the surface 228; that is, when the totalizers are not in overdrawn condition. However, the large-diameter stud 222 imparts more counter-clockwise movement to the lever 224 than the small-diameter stud, thus causing the stud 248 (Fig. 2) to rock the bell crank 246 clockwise sufficiently to shift the slide 244 toward the left, to move the projection 243, which is normally to the right of and out of coacting relationship with the shoulder on the bar 229, into the path of said shoulder. Left-hand shifting movement of the lever 224, when the carriage arrives in a preselected columnar position, causes said projection, in cooperation with the shoulder on the bar 229, to shift said bar upwardly to automatically release the machine for operation, when a totalizer is in an overdrawn condition. This so-called "two step" mechanism for controlling the automatic release of the machine when a totalizer is in an overdrawn condition is fully disclosed in the Christian et al. Patent No. 2,626,750, to which reference may be had for a more complete disclosure of said mechanism.

Mechanism is provided for rocking the lever 226 (Fig. 2) counter-clockwise to initiate machine operation when the traveling carriage is traveling in a right-hand, or return, direction.

The upward extension of the lever 226 (Figs. 2 and 6) carries a square stud 250, arranged to coact with a hook 251, formed on the right-hand end of a bell crank 252, pivoted on a stud 253 in the upper end of a lever 254, pivoted on a stud 255, secured in the bar 106. A downward extension of the lever 254 carries a stud 256, which coacts with a downward extension 257 of the reverse tabulating control lever 187 (Fig. 4). The bell crank 252 carries a stud 258, which engages a slot in the lower end of a link 259, the upper end of which is slotted to receive a stud 260 in the release control lever 224. A spring 261 urges the bell crank 252 upwardly and toward the right to normally maintain an upwardly-extending finger 262 thereof in yielding contact with a fixed stud 263 and to normally urge the lever 254 clockwise to maintain the stud 256 in yielding engagement with the extension 257. Under normal conditions, the slots in the link 259, in cooperation with the corresponding studs 258 and 260, maintain the hook 251 beneath the square stud 250, as shown in Fig. 6, against the action of the spring 261.

As previously explained, in reverse tabulating operations of the traveling carriage, the lever 193 lifts the lever 187 to disengage the step 191 from the stud 192 to free said lever for left-hand shifting movement under action of the spring 189. Left-hand shifting movement of the lever 187 withdraws the extension 257 from the stud 256 to permit the spring 261 (Fig. 6) to shift the bell crank 252 and the lever 254 toward the right and clockwise, respectively, to move the hook 251 beneath and into engaging relationship with the stud 250. Afterwards, counter-clockwise movement of the lever 224, upon being engaged by one of the studs 222 (Fig. 2), removes restraint from the link 259 and permits the spring 261 to rock the bell crank 252 counter-clockwise (Fig. 6) to engage the hook 251 with the stud 250. Immediately thereafter, restoration of the lever 187 toward the right, by engagement of the return tabulating stop 202 (Figs. 4 and 12) with the abutment surface 201, as explained before, causes the extension 257, in cooperation with the stud 256, to rock the lever 254 counter-clockwise on its pivot stud 255. Counter-clockwise movement of the lever 254 shifts the bell crank 252 toward the left, causing the hook 251, in cooperation with the stud 250, to rock the lever 226 counter-clockwise. This causes the surface 228, in cooperation with the shoulder on the upper end of the bar 229 (Fig. 7), to lift said bar, in the manner explained before, to rock the lever 92 counter-clockwise, against the action of the spring 98, to initiate an automatic operation of the machine, upon return tabulating movement of the traveling carriage.

After the lever 226 has been rocked sufficiently to initiate machine operation, engagement of the finger 262 with the stud 263 (Figs. 2 and 6) restores the bell crank 252 and the hook 251 downwardly, or clockwise, to normal position, beneath and out of coacting relationship with the stud 250, as shown here, so as not to interfere with normal operation of said lever upon forward tabulation of the traveling carriage. Restoring movement toward the right of the lever 187, through the link 259 (Fig. 4), further assists in restoring the bell crank 252 to normal position, where it is out of coacting relationship with the stud 250.

*Case shifting mechanism for typewriter*

The typewriter keys 54 (Fig. 1) actuate corresponding type leves 265 (Fig. 10) pivotally supported in corresponding slots in a type lever segment 266 by a wire which engages a groove in said segment. The segment 266 is shiftable mounted by means of a plurality of toggle arms 267 and 268, the outer ends of which are pivotally connected to said segment 266 and the inner ends of which are secured on shafts 269 and 270 rotatably supported in angle bar 271 secured to the machine framework. The forward ends of the type bars 265 normally rest on a cushioning pad attached to the inner surface of an arcuate bar 272, supported for shifting movement in unison with the segment 266 by means of an arm 273, the inner end of which is pivotally connected to the bar 272 and the outer end of which is secured on a shaft 274 (see also Fig. 2) journaled in the machine framework. The bar 272 is further mounted for shifting movement by means of an upwardly-extending arm 275, having a slot which engages a guide stud 276 secured in the machine framework.

Secured on the shaft 270 (Figs. 10 and 11) is a crank 277 pivotally connected by a link 278 to a lever 279 in turn pivotally supported by a hanger 281 secured to the bar 271. The rear end of a link 282 is pivotally connected to the lever 279, while the forward end of said link is pivotally connected to an upward extension of a shift key lever 283, in turn pivotally supported on a rod mounted in the typewriter framework. The link 282 has secured thereto a downwardly-extending arm 284 having a slot which engages a stud in the downward end of an arm 286 secured on the shaft 274. A spring 287 urges the lever 283 clockwise (Fig. 10) to maintain the Shift key 57 in a normal, undepressed, position, as shown here, and to urge the link 282 rearwardly, which, in cooperation with a spring 288, tensioned between a plate connected to the bar 271 and a crank fast on the shaft 270, urges said shaft clockwise, which, through the toggle arms 267 and 268, maintains the segment 266 and the bar 272 in their upward position, as shown here, so that under normal conditions the lower-case characters on the type bars 265 will be in printing position.

Depression of the Shift key 57 (Figs. 10 and 11), against the action of the springs 287 and 288, shifts the link 282 forwardly to rock the shaft 270 counter-clockwise, thus causing the toggle arms 267 and 268 to shift the segment 266 downwardly. Forward shifting movement of the link 282, through the arm 284, rocks the arm 286, the shaft 274, and the arm 273 clockwise. This causes the arm 273 to shift the bar 272 downwardly in unison with the segment 266 to assist in shifting the type bars 265 downwardly from lower-case printing position to upper-case printing position. Release of pressure on the Shift key 57 permits the springs 287 and 288 to restore the segment 266 and the bar 272 upwardly to normal position, in which the lower-case characters on the type bars 265 are in printing position.

Inasmuch as the present application is concerned principally with the traveling carriage and associated mechanism for controlling various functions of the machine, including automatic cycling while said carriage is moving in either forward or return tabulating directions, it is believed that a full understanding of the operation of the machine will have been obtained from a perusal of the preceding description, and further explanation of operation is therefore regarded as unnecessary and will be omitted. However, it should be remembered that, while the machine is arranged for use in connection with the Arabic language, this does not in any way interfere with or prevent the use of the machine in connection with other languages, as all that is required to adapt said machine for such use is to change the characters on the keys and type carriers of the accounting machine portion and the typewriter portion to the characters for the language to which it is desired to adapt the machine.

While the form of mechanism herein shown and described is admirably adapted to fulfill the objects primarily stated, it is to be understood that it is not intended to confine the invention to the one form or embodiment disclosed herein, for it is susceptible of embodiment in various forms all coming within the spirit and scope of this invention.

What is claimed is:

1. In a machine of the class described having a traveling carriage movable to various columnar positions and a machine-operating mechanism, the combination of power means for driving the machine-operating mechanism; a normally disengaged clutch device to connect the power means to the machine-operating mechanism; means operated by the power means for moving the traveling carriage from one columnar position to another; normally effective means for retaining the traveling carriage against movement by the moving means; a tabulating device including a member constructed and arranged to be moved from a normal position to a moved position to release the retaining means to free the traveling carriage for movement, and to be returned by said carriage from said moved position back to said normal position to engage the retaining means to arrest said carriage in a selected columnar position; means to engage the clutch mechanism to initiate operation of the machine; a part connected to the engaging means; means engageable with the part to actuate said part and the engaging means, said actuating means normally disengaged from said part; and means rendered effective jointly by the traveling carriage in preselected columnar positions and by the member when in moved position to engage the actuating means with the part, said engaging means rendered effective upon restoration of said member from moved position to normal position to cause said actuating means to actuate the part, to operate the engaging mechanism to initiate an automatic operation of the machine under control of the traveling carriage in selected columnar positions.

2. In a machine of the class described, having a traveling carriage, and a continuously-operating power drive means for giving the machine cycles of operation and for driving the traveling carriage, the combination of normally ineffective means to connect the power drive means to the machine; releasing means to render the connecting means effective to initiate a cycle of machine operation; reversible means to connect the power drive means to the traveling carriage to drive said traveling carriage in forward and return directions to various preselected columnar positions; means to retain the traveling carriage in any preselected columnar position; tabulating mechanism for controlling the retaining means and the reversible means to cause the traveling carriage to tabulate in forward and return directions to any preselected columnar position; and means rendered effective and operated jointly by the tabulating mechanism and by the traveling carriage upon its movement into preselected columnar positions while traveling in either a forward or return direction, for operating the releasing means to initiate an automatic cycle of machine operation.

3. In a machine of the class described, having a traveling carriage and continuously-operating power means for giving the machine cycles of operation and for driving the traveling carriage, the combination of normally ineffective means to connect the power drive means to the machine; reversible means to connect the power drive means to the traveling carriage to drive said traveling carriage in either forward or return tabulating direction to various preselected columnar positions; means to retain the traveling carriage in any preselected columnar position; means to control the retaining means and the reversible means to cause the traveling carriage to be tabulated in a forward direction to any preselected columnar position; means to control the retaining means and the reversible means to cause the traveling carriage to be tabulated in return direction to any preselected columnar position; and means rendered effective and operated jointly by either of the control means and by the traveling carriage upon its movement into preselected columnar positions when tabulating in either forward or return direction to render the connecting means effective to initiate an automatic cycle of machine operation.

4. In a machine of the class described, having means to release the machine for operation, a traveling carriage shiftable horizontally to various columnar positions, continuously-operating power means to operate the machine and to shift the traveling carriage, and a non-positive fluid clutch to connect the power means to the traveling carriage, the combination of reversible means to connect the fluid clutch to the traveling carriage; normally effective means to retain the traveling carriage against shifting movement in either direction; a first means to control the retaining means and the reversible means to cause the traveling carriage to shift in one direction to a preselected columnar position; a second means to control the retaining means and the reversible means to cause the traveling carriage to shift in the reverse direction to a preselected columnar position; normally ineffective means to connect the power means to the machine; means operable by the machine-releasing means to render the connecting means effective to initiate operation of the machine; and means rendered effective jointly by the traveling carriage in said predetermined columnar positions and by either of the controlling means, and operable jointly by said controlling means and by the traveling carriage upon its movement into said preselected columnar positions while traveling in either direction, to actuate the machine-releasing means to initiate an automatic operation of the machine.

5. In a machine of the class described, having means to release the machine for operation, a traveling carriage shiftable horizontally to various columnar positions, continuously-operating power means to operate the machine and to shift the traveling carriage, and a non-positive fluid clutch device to connect the power means to the traveling carriage, the combination of reversible means to connect the fluid clutch to the traveling carriage, said reversible means normally effective to cause the traveling carriage to be shifted in one direction; means to operate the reversible means to cause the traveling carriage to be shifted in the opposite direction; normally effective means to retain the carriage against shifting movement in either direction; a first device movable from a normal position to disable the retaining means and to render the operating means for the reversible means effective to cause the traveling carriage to be shifted in said opposite direction, said first device constructed and arranged to be restored to normal position by the traveling carriage upon its arrival in a preselected columnar position, to enable the retaining means and to render the operating means for the reversible means ineffective, to locate said traveling carriage in said preselected columnar position; a second device movable from a normal position to disable the retaining means to cause the traveling carriage to be shifted in said one direction, said second device constructed and arranged to be restored to normal position by the traveling carriage upon its arrival in a preselected columnar position, to enable the retaining means to locate said traveling carriage in said preselected columnar position; and means rendered effective jointly by either of the two devices upon movement from normal position and by the traveling carriage in said preselected columnar positions, and operable by either of said devices when they are restored by the traveling carriage, to actuate the machine-releasing means to initiate an automatic operation of the machine when the traveling carriage is shifted in either direction to a preselected columnar position.

6. In a machine of the class described, having a traveling carriage movable to various preselected columnar positions, and a main operating mechanism, the combination of a power drive means for the main operating mechanism; cycle-initiating means for controlling the engagement of the power drive means with the main operating mechanism to cause the latter means to be given cycles of operation; reversible means operated by the power drive means for moving the traveling carriage, said reversible means normally effective to move the traveling carriage in one direction; means to reverse the reversible means to cause the traveling carriage to be moved in a reverse direction; means to retain the traveling carriage against movement in either direction; a first tabulating device including a first member constructed and arranged to be moved from a normal position to a moved position to release the retaining means and to operate the reversing means to cause the traveling carriage to be moved in said reverse direction, said member constructed and arranged to be returned from said moved position back to said normal position by said traveling carriage upon its arrival in a preselected columnar position, to restore the retaining means and thus to arrest said traveling carriage in said preselected columnar position; an element constructed and arranged to be selectively engaged with the first member under control of the traveling carriage; means operatively connecting said element to the cycle-initiating means; means actuated by the traveling carriage in said preselected columnar position for engaging the element with the first member, whereby restoration of said first member to normal position causes the power drive means to be engaged with the machine-operating mechanism, to initiate an automatic operation of the machine under control of the traveling carriage when moved in said reverse direction to a preselected columnar position; a second tabulating device, including a second member constructed and arranged to be moved from a normal position to a moved position to release the carriage-retaining means, to free the traveling carriage for movement in said one direction, said member constructed and arranged to be restored ot normal position by said traveling carriage when it arrives in a preselected columnar position, to in turn restore the carriage-retaining means and thus to arrest said traveling carriage in said preselected columnar position; and means rendered effective jointly by the element when it is operated by the traveling carriage and by the second member upon its movement from normal position, and operated by said second member when it is restored to normal position, to cause the power drive means to be engaged with the machine-operating mechanism to initiate an automatic operation of the machine under control of the traveling carriage when it is moved in said one direction to a preselected columnar position.

7. In a machine of the class described, having a traveling carriage, movable horizontally to various preselected columnar positions, a main operating mechanism, and continuously operating power means to drive the main operating mechanism, the combination of a normally disengaged clutch device to connect the power means to the operating mechanism; machine-releasing means to control the clutch device to cause the machine to be given cycles of operation; yieldable means operable by the power means to move the traveling carriage to various columnar positions; a tabulating mechanism including a member having a first movement to free the traveling carriage to the action of the yieldable means, said member constructed and arranged to be given a second movement by the traveling carriage to arrest said traveling carriage in a preselected columnar position; an element arranged to be operated by the traveling carriage in said preselected columnar position; a part operatively connected to the releasing means; a projection on the part; a lever for operating the part, said lever in turn arranged to be operated by the member; a hook-shaped latch carried by the lever and arranged to coact with the projection, but normally out of coacting relationship therewith; and means whereby operation of the element by the traveling carriage and operation of the lever by the member during its first movement move the latch into coacting relationship with the projection, and further operation of the lever by the member during its second movement causes said latch, in cooperation with the projection and the part, to actuate the machine releasing means to cause the machine to perform a cycle of operation under control of the traveling carriage in said preselected columnar position.

References Cited in the file of this patent

UNITED STATES PATENTS

| | | |
|---|---|---|
| 2,422,402 | Davidson et al. | June 1, 1948 |
| 2,597,162 | Mehan et al. | May 20, 1952 |
| 2,626,749 | Christian et al. | Jan. 27, 1953 |
| 2,629,549 | Butler | Feb. 24, 1953 |
| 2,709,511 | Dicke | May 31, 1955 |